Dec. 23, 1941.  J. ROMAZZOTTI  2,267,537
ELECTRIC FURNACE
Filed Dec. 12, 1940
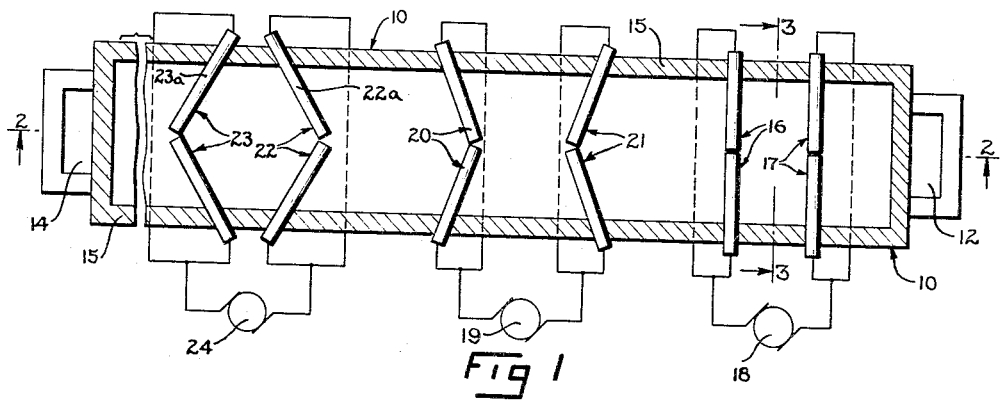
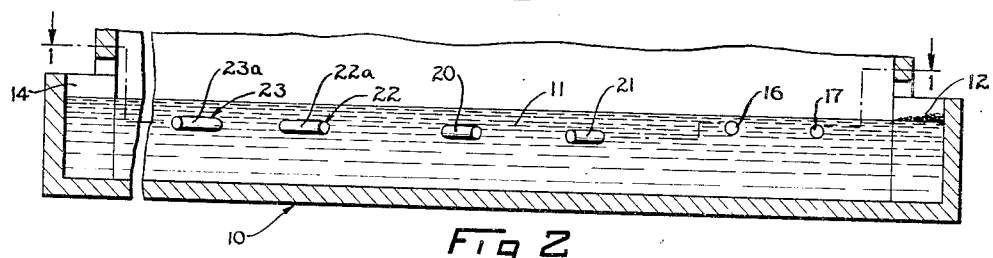
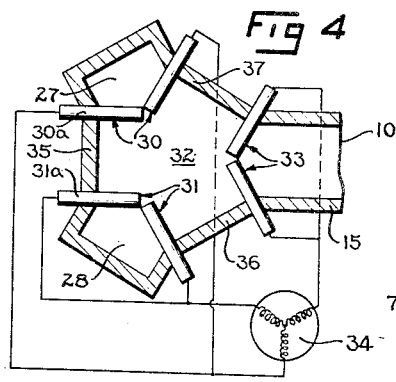
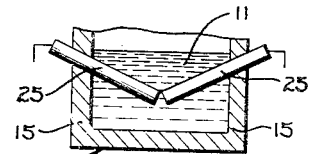
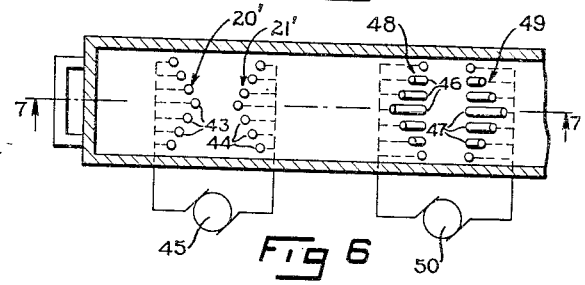
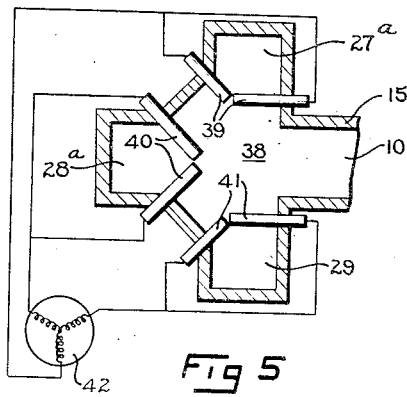
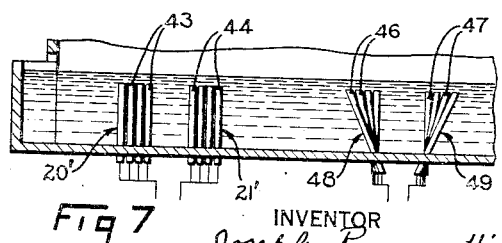
INVENTOR
Joseph Romazzotti
BY
F. Bascom Smith
ATTORNEY Patented Dec. 23, 1941

2,267,537

UNITED STATES PATENT OFFICE 2,267,537

ELECTRIC FURNACE

Joseph Romazzotti, Versailles, France, assignor to Societe Anonyme des Manufactures des Glaces & Produits Chimiques de Saint-Gobain, Chauny & Cirey, Paris, France, a corporation of France Application December 12, 1940, Serial No. 369,911
In France July 17, 1939

12 Claims. (Cl. 13—6)

This invention relates to electric furnaces and more particularly to furnaces adapted for fusing and heat treating vitreous substances, such as glass and glass making materials, wherein heating is effected, either totally or partly, by the passage of electric current through said substances.

It has been heretofore proposed in the manufacture of glass to pass electric current through the glass bath itself between electrodes of opposite polarities immersed therein. In furnaces employing electric heating means of this character there are problems concerning the heat distribution in the glass mass, the cooling effect of the furnace walls and the deterioration of said walls which may be satisfactorily solved according to the present invention.

It is an object of the present invention to provide an electric melting furnace wherein the desirable heat distribution is obtainable in the treated mass.

Another object of the invention is to provide apparatus of the above character wherein the electrodes are mounted in a novel manner with respect to each other and the walls of the furnace to obtain the desired distribution of the heating effect of the electric current flowing between them.

Still another object is to provide a novel electric furnace which is so constructed that the deleterious effects of the cooling action of the furnace walls on the treated materials contacting the same may be minimized.

A further object is to provide novelly arranged electrodes in an electric furnace whereby satisfactory heat distribution in the treated mass is obtained with a minimum of furnace wall deterioration A still further object is to provide novel means for creating most satisfactory temperatures in the treated materials transversely of a basin furnace wherein materials to be treated are supplied adjacent one end and the finished product is removed from adjacent the other end.

Another object is to provide a novel electric furnace wherein the flow of electric current through the treated mass is regulated in such manner as to control the heating effect thereof in the transverse direction of the furnace.

Still another object is to provide novel means in an electric furnace whereby location, transversely of the furnace, of the zones of highest heat intensity in different horizontal layers of the treated mass may be advantageously controlled.

Still another object is to provide a novel electric glass making furnace which is adapted to rapidly and economically produce a high quality glass product with minimum furnace wall deterioration and consequent contamination of the glass.

The above and further objects and novel features of the invention will more fully appear from the following detailed description when the same is read in connection with the accompanying drawing. It is to be expressly understood, however, that the drawing is for the purpose of illustration only and are not intended to define the limits of the invention, reference for this latter purpose being had primarily to the appended claims.

In the drawing wherein like reference characters refer to like parts throughout the several views:

Fig. 1 is a somewhat diagrammatical top view, partly in section and with parts broken away, of a furnace embodying various forms of the present invention;

Fig. 2 is a side elevation of said furnace, partly in section and with parts broken away, the section being taken substantially on line 2—2 of Fig. 1;

Fig. 3 is a sectional view of a furnace similar to that of Fig. 1 but showing another form of the invention;

Fig. 4 is a detail view showing, on a reduced scale, a modification of the inlet end or melting chamber of the furnace of Fig. 1;

Fig. 5 is a similar view showing a second modification of the inlet end of the furnace of Fig. 1;

Fig. 6 is a view similar to Fig. 1 embodying other forms of the invention; and,

Fig. 7 is a sectional side elevation of the furnace shown in Fig. 6, the section being taken substantially on line 7—7 of Fig. 6.

A limited number of embodiments of the present invention are illustrated in the accompanying drawing, by way of example, in the form of basin glass making furnaces of the continuous process type wherein the supply of glass making materials and removal of the finished glass are made at opposite ends of the furnace. In the interest of economy, rapidity of production and the production of high quality homogeneous glass in furnaces of this type, it is highly desirable to employ as little heat energy as possible and to subject all of the particles of the treated mass to substantially the same heat treatments for the minimum periods of time consistent with the production of good glass. To accomplish these results the flow of the treated mass longitudinally of the furnace should be relatively constant and steady through relatively separate, well-defined heat zones wherein correct temperatures for carrying out the various steps of the heat treating process are maintained, thereby insuring the proper and substantially uniform treatment of all the particles which is necessary in producing homogeneous glass.

In one type of electric furnace heretofore provided which has proved quite satisfactory with respect to the attainment of the foregoing results and which produces better glass more rapidly and economically than other types of previously known glass making furnaces, elongated electrodes (which, in certain cases, may have small surface areas in comparison to the smallest cross-sectional area of the glass mass between cooperating electrodes of opposite polarities) are mounted to extend horizontally and transversely across or substantially across the entire width of the furnace below the level of the glass mass in proper positions to establish the desired heat zones and to thermally and physically control the flow of the mass. In such a furnace the heating effect of the electric current flowing through the mass between cooperating electrodes is substantially uniform transversely of the furnace i. e. the heating effect at all points along any selected horizontal transverse line through the furnace between two parallel electrodes is substantially the same. In some furnaces of the above construction or in certain sections thereof the uniform, transverse distribution of heat which would otherwise occur may be disturbed somewhat by perturbing influences, such as the cooling action of the furnace side walls on the heated materials which come in contact therewith. Additionally, in some sections of a furnace, particularly in parts wherein the highest temperatures are required and maintained, the intense heat tends to attack the refractory walls of the furnace and the consequent deterioration of the latter lessens the useful life of the furnace and tends, in turn, to contaminate the glass and adversely affect the quality thereof.

The present invention comprehends a novel furnace structure whereby the above-mentioned difficulties may be substantially obviated, said furnace, in the form illustrated in Figs. 1 and 2, comprising a container or tank 10 made of suitable refractory materials for containing a quantity of molten glass 11. Said tank or container is provided with an inlet 12 adjacent one end thereof through which the furnace may be charged with glass making materials and an outlet 14 adjacent the opposite end through which molten glass in a finished state may be removed from the furnace for fabrication into a variety of glass articles. Situated between the inlet and outlet and supported by side walls 15 of container 10 below the surface of mass 11 are two electrodes 16 and 17 which are made of graphite or other suitable material and electrically connected to two different terminals of a suitable source of electric energy, such as a generator 18. Said electrodes extend across the entire width of container 10 and are spaced from one another in the longitudinal direction of the latter so that electrical current will flow from one electrode to the other through mass 11 as a resistance and thus heat the same in the zone between the electrodes to a temperature above the fusing point thereof by what is known as Joule effect. In the form illustrated, each of the electrodes 16 and 17 is made up of two component parts extending horizontally into the glass mass 11 through diametrically disposed openings in side walls 15, said parts preferably meeting each other adjacent a vertical plane containing the longitudinal center line of container 10.

The present invention comprehends a novel arrangement of electrodes whereby the wear and tear on the refractory material of the side walls of the furnace may be minimized, such as in the refining section of the furnace wherein extremely high temperatures must be maintained. It is well known that the walls of an electric furnace are adversely affected by both the intensity of the heat and the flow of electric current through the particles of the mass which are in the immediate vicinity of the walls. Electrodes 20 and 21 which are electrically connected to opposite terminals of a source of electrical energy 19 are mounted in a novel manner in tank 10 to accomplish the above result. Each of said electrodes is constituted by two component parts which may be identical with and supported by walls 15 in a similar manner to the component parts of electrodes 16 and 17, but with the parts thereof extending inwardly from walls 15 in converging relation with the corresponding parts of the other. In this arrangement the shortest distance between the cooperating electrodes is adjacent the longitudinal center of the furnace so that the electric current density and, hence, the heating effect or temperature will be greater at the center of the furnace than near the side walls in the zone between electrodes 20 and 21. Either of these electrodes may extend straight across the furnace, if desired, it being necessary only that the corresponding halves or components of cooperating electrodes converge toward the center of the furnace. Thus electrodes 22 and 20, which converge slightly toward the center of the furnace might, for example, be connected to opposite terminals of a source of energy to produce the same effect, in a lesser degree, as electrodes 20 and 21.

For the purpose of providing variations across the width of the furnace in the heating effect of the current flowing between the other electrodes 22 and 23 to thus compensate for the cooling effect of walls 15 on the glass bath, the corresponding component parts 22a and 23a for example, of electrodes 22 and 23 extend inwardly in diverging directions, each making an acute angle with walls 15 and the longitudinal center line of the furnace. The distance between corresponding points on the electrodes, and, hence, the quantity and electrical resistance of mass 11 between said corresponding points is smallest adjacent walls 15 and increases to a maximum at the center of tank 10. Since the current flowing between electrodes 22 and 23 follows the path of least resistance the fields of greatest electrical current density and hence greatest heat intensity occur adjacent walls 15. It will accordingly be seen that by properly adjusting the angle of divergence between corresponding components of electrodes 22 and 23, the cooling effect of walls 15 on the glass mass may be compensated for so that in any particular longitudinal zone of the furnace a relatively uniform temperature across the width thereof may be maintained. A relatively constant temperature is also thus maintained along the furnace walls, thereby reducing the deterioration thereof and consequent contamination of the glass mass. In some instances one of the electrodes 22 and 23 may be constituted by a single straight bar extending across the entire width of the furnace perpendicular to walls 15 or the component parts thereof might extend toward the other electrode but at a different angle to the side walls, it being necessary only that corresponding portions of the electrodes diverge toward the center of the furnace.

Although electrodes 22 and 23 may be adjustably mounted so that the free ends thereof within the furnace may be orientated or moved to any desired position with respect to the vertical plane containing the longitudinal center line of the furnace, the same preferably have a driving fit in suitable openings through walls 15, the angle which the same make with said walls being predetermined and fixed in each particular furnace. It will be seen that an electrode thus mounted may be readily replaced by first withdrawing one component part thereof a short distance and then driving the other part, i. e. the part to be replaced, into the glass bath with the new electrode part which replaces it. The old electrode may then be readily removed from the glass bath. In order to insure that each component part of a multiple part electrode will be at the same potential, an electrical connection from source 24 may be made to the outer end of each of said parts. As shown, the component parts of each electrode are connected in parallel. Preferably the component parts of the electrodes are rod-like in shape. The surface area of each electrode may be less than the smallest cross-sectional area of the glass mass between the electrodes so that there will be a greater concentration of electric current adjacent the electrodes than at any point between them, thereby creating a high intensity heat zone in the immediate vicinity of each electrode. If desired, hollow electrodes of the character disclosed in Peyches application Serial No. 287,913, filed August 2, 1939 may be employed.

With the above-described arrangements of the electrodes the variations in the heating effect between side walls 15 are similar in each horizontal plane from the surface of the mass to the bottom of the tank, i. e. each layer of the treated mass is affected to about the same degree and in the same manner. If desired, different transverse variations in the heating effect of the electric current may be obtained in different horizontal planes or layers of the mass to create, for example, desirable circulation or convection currents in the molten mass. This novel result may be obtained by extending the component parts of a pair of electrodes, similar to those above discussed, downwardly or upwardly toward the center of the furnace in vertical transverse planes and at an acute angle to side walls 15, one of these downwardly extending electrodes being illustrated at 25 in Fig. 3. These electrodes are connected to opposite terminals of a source of energy and the opposed halves or component parts of each electrode extend downwardly at acute angles to supporting wall 15 (Figure 3) and closely approach each other at the center of the furnace. The corresponding parts of electrode 25 and a similar electrode (not shown) may be parallel to each other so that the distance between said electrodes is constant across the entire width of the furnace. Near the bottom of the furnace, however, between these electrodes the greatest electric current concentration and hence heating effect is near the center of the furnace, whereas in the layers of the mass nearer the surface, the regions of greatest current density and heat intensity are nearer the side walls. If the angle which the parts of the electrode 25 and its cooperating electrode make with walls 15 is reversed, so that said parts extend upwardly toward the center of the tank, the regions of greatest heat intensity or heating effect of the electric current in the upper layers of the mass between the electrodes will be in the center of the tank whereas in the deeper layers of the mass said regions will be nearer the side walls of the tank.

It will be apparent that electrodes 20, 21 and 22, 23 of Fig. 1, in addition to converging and diverging, respectively, may also have the component parts thereof installed or adjusted to extend upwardly or downwardly as well, similarly to electrode 25 of Fig. 3. Electrodes so mounted will have the combined effect of regulating or distributing the heating effect of the electrical current both in a transverse and a vertical direction in the glass mass. In some instances it may also be desirable to mount one of a cooperating pair of electrodes unsymmetrically with respect to the other in either the horizontal or vertical planes or both instead of symmetrically as illustrated in Fig. 1. It will be understood that any one of the sets of electrodes illustrated in Fig. 1 may be employed without the others or that any two or all three sets may be employed in a single furnace to provide heat zones of different characteristics in different longitudinal portions thereof.

In Figs. 4 and 5, adaptations of the invention for use in furnaces having a plurality of inlets for the introduction of materials to be treated and for use in installations employing a three-phase electric current supply are shown. Fig. 4 illustrates the inlet end of a Y-shaped furnace having two inlet chambers 27 and 28 and Fig. 5 is a similar view of a T-shaped furnace having three inlet chambers 27a, 28a and 29. The furnace end portions illustrated in these figures may constitute the inlet end of the furnace 10 shown in Fig. 1.

In Fig. 4 two electrodes 30 and 31 are arranged across the passages between inlet chambers 27 and 28, respectively, and the main melting or fusion chamber 32, and a third electrode 33 extends across the passage between said fusion chamber and the remainder of the furnace which includes the refining and extraction zones. Said electrodes are connected in the manner illustrated to different terminals of a suitable source 34 of three-phase electric current and each comprises two component parts which make acute angles with each other and meet adjacent the center lines of the chamber or compartment across which they are mounted. Preferably the adjacent component parts of adjacent electrodes, such as parts 30a and 31a, are parallel with each other and extend perpendicular to the straight wall portions 35, 36 and 37 which form the walls of fusion chamber 32 between the mouths of inlet chambers 27 and 28. By thus mounting the electrodes so that the electric current flows from one to the other in straight lines parallel to the wall surfaces between them, wear on the furnace walls resulting from the heat and current flow is minimized. If it is desired to concentrate the current density near the wall surface to counteract any cooling action thereof, the cooperating portions i. e. adjacent portions, of adjacent electrodes may extend from the walls in slightly diverging relation or, if less heat is desired near the wall surfaces to reduce the wear thereon, said electrode parts may extend from the walls in converging relation.

In Fig. 5, the inlet chambers or compartments 27a, 28a and 29 are arranged in a T formation and open into a main melting chamber or compartment 38 which, in turn, communicates with the portion of the furnace that includes the refining and extraction zones. Mounted in the passages between said inlet compartments and the central melting compartment are composite two-part electrodes 39, 40 and 41. As in Fig. 4, the parts of these electrodes are shown perpendicular to the straight wall portions through which they extend so that adjacent parts of different electrodes extending through the same wall portions are parallel to one another. Each of the electrodes 39, 40 and 41 may be connected to a different terminal of a three-phase generator 42 or other suitable source of electric energy. If desired, the cooperating parts of the various electrodes may diverge or converge within the furnace, depending upon the electric current or heat distribution desired.

The present invention may also be embodied in furnaces employing electrodes differing structurally from those above described. For example each electrode may be constituted by a plurality of closely arranged bar-like elements extending through the bottom of the container or downwardly into the glass mass from directly above the latter. As illustrated in Figs. 6 and 7, each of a pair of converging electrodes 20' and 21', which are comparable to electrodes 20 and 21 above described, is composed of a plurality of vertically extending electrode elements 43 and 44, respectively, electrically connected in parallel with each other, the composite electrodes being connected to different terminals of a source of electrical energy 45. It will be seen that lines in a horizontal plane joining the centers of elements 43 and 44, respectively, are crooked or curved lines which converge toward one another at the center of the furnace. The distance between the two composite electrodes is accordingly shortest at the center of the furnace and greatest near the side walls so that the distribution of the heating effect will be substantially the same as that provided by electrodes 20 and 21 of Fig. 1. If desired the elements 43 and 44 may be arranged in non-rectilinear lines which bow away from one another at the center of the furnace or at some other point between the side walls to thereby obtain the same effects as may be obtained with electrodes 22 and 23 of Fig. 1.

At the right in Fig. 6 and 7, a second novel arrangement of vertically extending composite electrodes is illustrated. The bases of the elements 46 and 47 making up the cooperating electrodes 48 and 49, respectively, form straight lines across the bottom of the furnace but the various elements are themselves tilted from the vertical at varying degrees to vary the distance between different sets of corresponding points on the two electrodes. As shown, the electrode elements of each composite electrode adjacent the side walls are vertical and the elements of one electrode nearer the center of the furnace are tilted in upwardly diverging relation with respect to corresponding elements of the other electrode so that the upper ends of the center elements of the two electrodes are furthest apart. It will be seen that with this arrangement the distance between corresponding points on the two electrodes varies not only transversely of the furnace in each horizontal plane but also in accordance with the depth in each vertical plane parallel to the center line of the furnace. In the particular form shown, electrodes 48 and 49 are of the diverging type and would be comparable to electrodes 22 and 23 heretofore described if the convergent parts of the latter were orientated to extend upwardly as well as in diverging directions. The elements 46 and the elements 47 are electrically connected in parallel with each other, respectively, and the composite electrodes thus formed are connected to opposite terminals of an electrical source 50.

There is thus provided a novel furnace adapted for the manufacture of glass wherein the materials are heated by passing electrical current through the glass mass and wherein novel means are provided for distributing and regulating the distribution of the electric current and hence the heating effect thereof. Novel arrangements of the electrodes are also comprehended whereby the temperature transversely and vertically, as well as longitudinally of the glass mass may be advantageously controlled. Additionally, means are provided whereby wear and tear on the furnace walls may be minimized and whereby the cooling action of the walls on the treated materials in the furnace may be rendered substantially negligible.

Although only a limited number of embodiments and modifications of the invention are illustrated and described, it is to be expressly understood that the same are not limited thereto but that various changes may be made therein, particularly in the design and arrangement of parts illustrated without departing from the spirit and scope of the invention as will now be apparent to those skilled in the art. For example, the various sets of electrodes shown may have the component parts thereof meet at points between side walls 15, 15 other than the midpoint, depending upon the desired distribution of the heating effect. For a definition of the limits of the invention reference is had primarily to the appended claims.

What is claimed is:

1. In apparatus of the class described, a container with substantially parallel side walls having an inlet adjacent one end thereof for the insertion of materials to be treated and an outlet adjacent the other end thereof, a source of electric energy, a plurality of electrodes projecting into the treated materials in said container, means connecting said electrodes to said source, at least two of the said electrodes extending substantially from one side wall to the other between said inlet and outlet and being connected to different terminals of said source, each of said last-named electrodes being constituted by at least two component parts electrically connected in parallel with each other, said parts being mounted in the container so that the distance between said two electrodes measured in the longitudinal direction of the container in a horizontal plane varies across the width of the container.

2. In apparatus of the class described having an inlet and an outlet for materials treated therein, a source of electric energy, a plurality of electrodes mounted in said container between said inlet and outlet and extending into and transversely across the flow path of said materials, means connecting said electrodes to different terminals of said source, at least one of said electrodes being constituted by at least two component parts projecting into the container through opposite side walls thereof in nonparallel directions, the ends of said component parts within the container being closely adjacent each other.

3. In apparatus of the class described wherein the flow of treated materials is from one end of the apparatus to the other, a container for a molten mass, a source of electric energy, a pair of electrodes immersed in the mass in said container, each of said electrodes extending transversely across substantially the entire width of said container, and means connecting said electrodes to different terminals of said source, the flow of electric current through said mass and the flow of the mass past the electrodes being primarily in the same general direction and at least one of said electrodes being constituted by at least two component parts, the longitudinal center lines of which make acute angles with the side walls of the container.

4. In apparatus of the class described, a container for a molten mass having substantially parallel side walls, a source of electric energy, a pair of electrodes extending into said mass, and means connecting said electrodes to different terminals of said source, at least one of said electrodes consisting of two rod-like component parts extending in non-parallel directions through diametrically disposed openings in said side walls, the ends of said parts within said container being adjacent each other.

5. In apparatus of the class described, a container for a molten mass and means for heating said mass including a pair of electrodes in said container surrounded by said mass, a source of electrical energy and means connecting said electrodes to different terminals of said source, each of said electrodes extending transversely across said container and comprising at least two rod-like component parts, the longitudinal center lines of said parts of each electrode being non-parallel and intersecting within the container adjacent a vertical plane containing the longitudinal center line of said container.

6. In a furnace adapted for manufacturing glass wherein the treated mass flows from one end of the furnace to the other, a container for a molten mass, a pair of electrodes in said container immersed in said mass, each of said electrodes comprising two rod-like component parts extending into said container in the same horizontal plane from opposed side walls thereof, corresponding parts of said electrodes extending inwardly from said side walls in diverging directions, a source of electrical energy, and means for connecting said electrodes to different terminals of said source, the component parts of each electrode being connected to terminals of like polarities.

7. In a furnace adapted for the manufacture of glass wherein the treated mass flows from one end of the furnace to the other, a container for a molten mass, a pair of electrodes in said container immersed in said mass, each of said electrodes comprising non-parallel portions, the portions of one of said electrodes extending inwardly from the side walls of said container in diverging relation to corresponding portions of the other electrode of said pair, a source of electrical energy, and means for connecting said electrodes to opposite terminals of said source.

8. In a furnace adapted for use in manufacturing glass wherein the treated mass flows from one end of the furnace to the other, a container for a molten mass, a pair of rod-like horizontal electrodes in said container immersed in said mass, each of said electrodes extending across substantially the entire width of said container and having a crooked longitudinal axis, the distance between said electrodes within the container measured parallel to the longitudinal center line of the container being greatest at the center of the container and gradually diminishing to a minimum adjacent the side walls of the container, a source of electric energy, and means for connecting said electrodes to opposite terminals of said source.

9. In a furnace adapted for manufacturing glass wherein the treated mass flows from one end of the furnace to the other, a container for a molten mass, a pair of electrodes in said container immersed in said mass, each of said electrodes comprising two rod-like component parts extending into the container in the same horizontal plane from opposed side walls of the latter, corresponding component parts of said electrodes extending inwardly from said side walls in converging directions, a source of electrical energy, and means for connecting said electrodes to different terminals of said source.

10. In a furnace adapted for use in the manufacture of glass wherein the treated mass flows from one end of the furnace to the other, a container for a molten mass, a pair of rod-like electrodes in said container immersed in said mass, each of said electrodes comprising non-parallel portions extending inwardly from opposite sides of the container, the portions of one of said electrodes extending inwardly from said walls in converging relation to the corresponding portions of the other electrode, a source of electrical energy, and means for connecting said electrodes to different terminals of said source.

11. In a furnace adapted for use in the manufacture of glass wherein the treated mass flows from one end of the furnace to the other, a container for a molten mass, a pair of rod-like horizontal electrodes in said container immersed in said mass, each of said electrodes extending across substantially the entire width of said container and having a crooked longitudinal axis, the distance between said electrodes within the container measured parallel to the longitudinal center line of the container being greatest adjacent the side walls of the container and gradually diminishing to a minimum at the center of the container, a source of electric energy, and means for connecting said electrodes to opposite terminals of said source.

12. In apparatus of the class described, a container for a molten mass having a plurality of inlet chambers adjacent one end thereof and a melting chamber communicating with each of said inlet chambers, an electrode extending entirely across each of the passages between said inlet chambers to said melting chamber, each of said electrodes being immersed in said mass and comprising at least two component parts extending inwardly in non-parallel directions toward said melting chamber, the ends of the component parts of each electrode within the container being closely adjacent each other, a source of electrical energy, and means for connecting each of said electrodes to a different terminal of said source.

JOSEPH ROMAZZOTTI